M. V. BROWN.
TRANSMISSION MECHANISM.
APPLICATION FILED MAY 17, 1920.
1,429,323.
Patented Sept. 19, 1922.
5 SHEETS—SHEET 4.
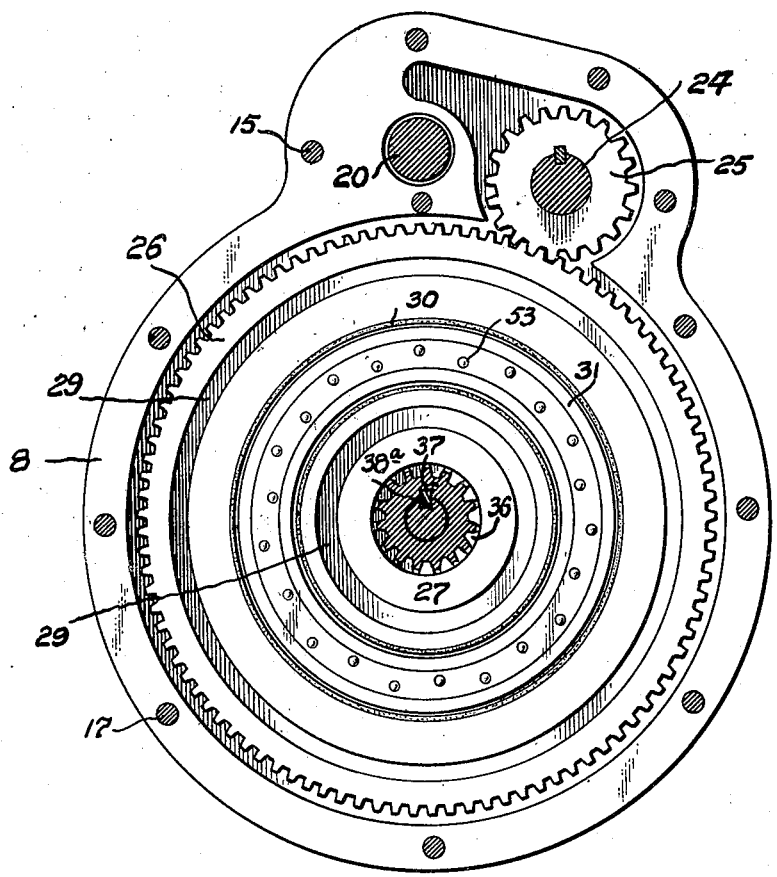
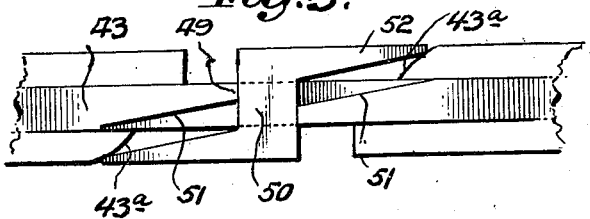
INVENTOR
Merton V. Brown,
BY
ATTORNEYS M. V. BROWN.
TRANSMISSION MECHANISM.
APPLICATION FILED MAY 17, 1920.
1,429,323.
Patented Sept. 19, 1922.
5 SHEETS—SHEET 5.
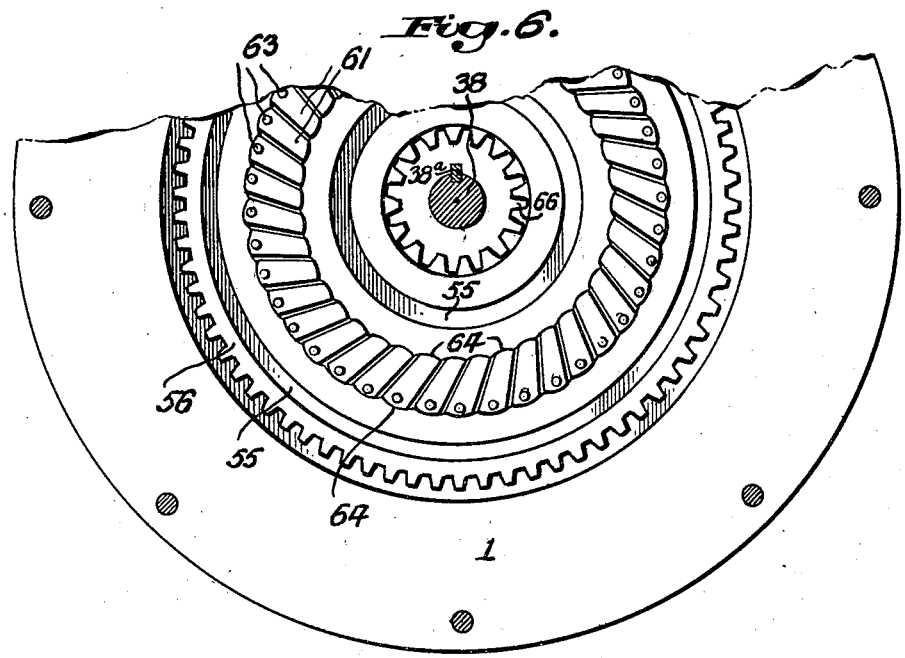
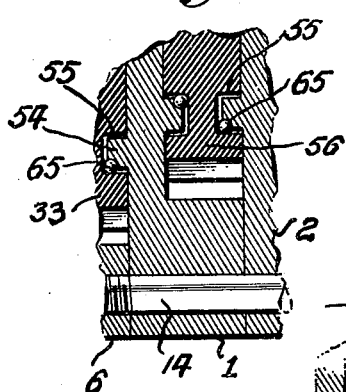
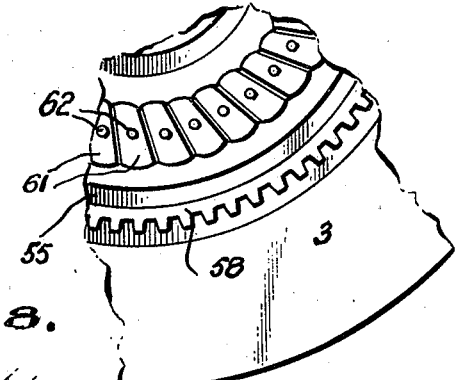
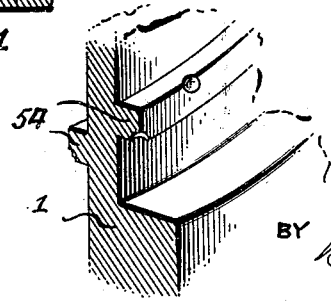
INVENTOR
Merton V. Brown,
BY
ATTORNEYS Patented Sept. 19, 1922.

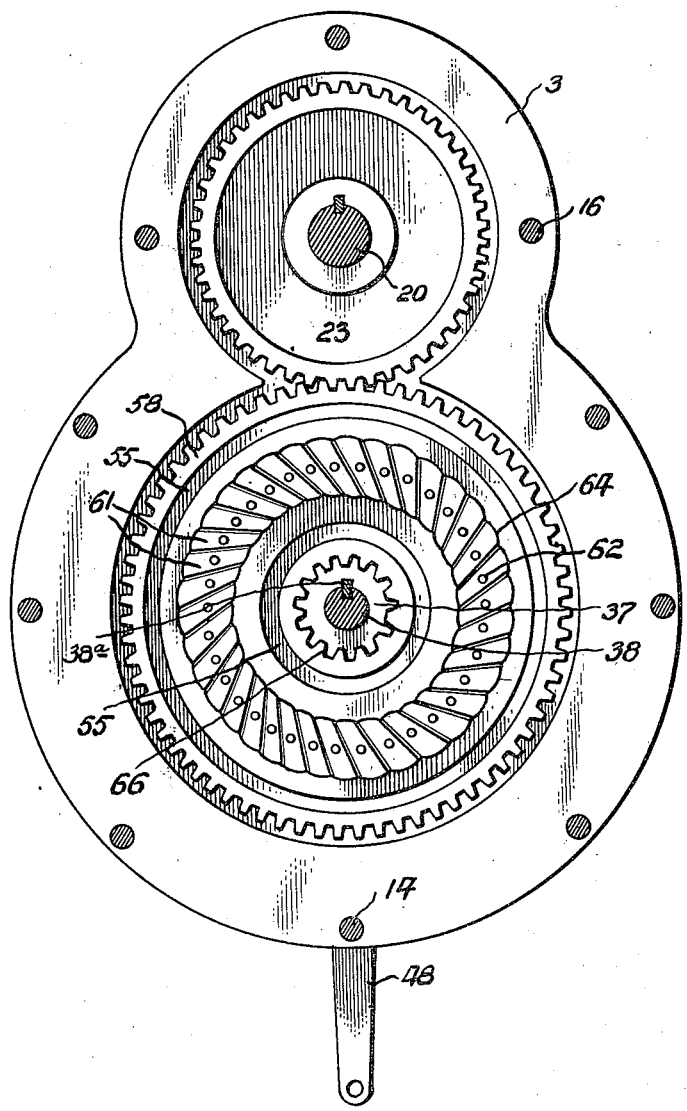

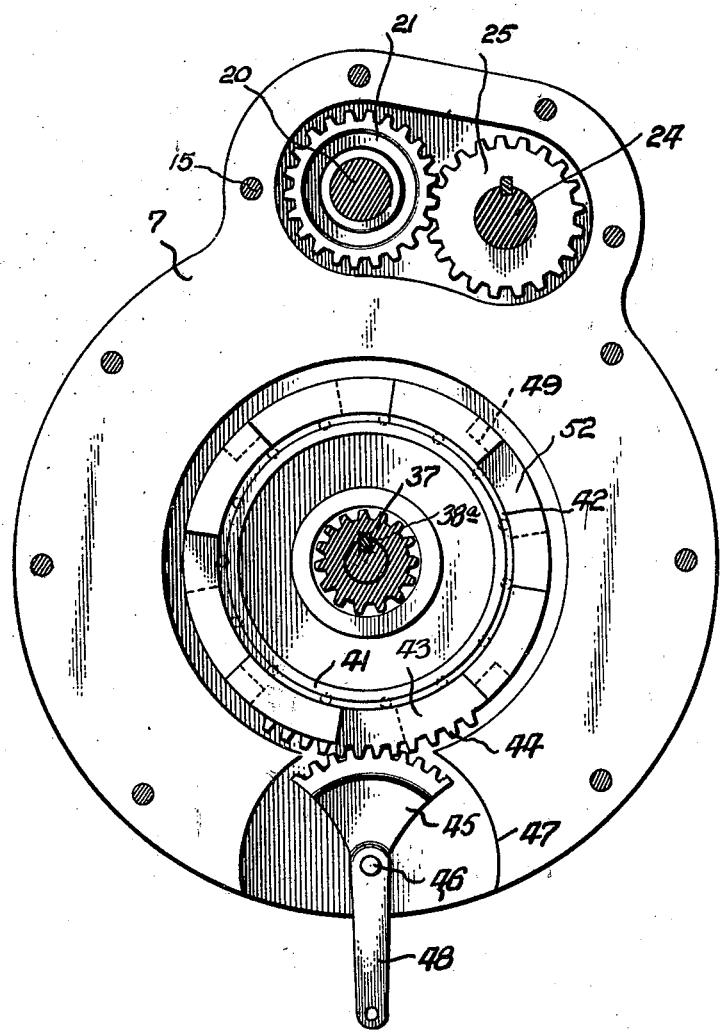

1,429,323

UNITED STATES PATENT OFFICE.

MERTON V. BROWN, OF DETROIT, MICHIGAN.

TRANSMISSION MECHANISM.

Application filed May 17, 1920. Serial No. 381,304.

*To all whom it may concern:*

Be it known that I, MERTON V. BROWN, a citizen of the United States of America, residing at Detroit, in the county of Wayne and State of Michigan, have invented certain new and useful Improvements in Transmission Mechanism, of which the following is a specification, reference being had therein to the accompanying drawings.

This invention relates to transmission mechanism, and has special reference to that class wherein the gear wheels or power transmitting elements are constantly in mesh and a selector employed, and by which a plurality of speeds, forward and reverse drive may be attained when the transmission mechanism forms part of a motor vehicle, lathe or any machine or apparatus requiring a compact change speed mechanism.

The primary object of my invention is to provide a comparatively short and compact transmission mechanism that may be advantageously used in connection with motor driven vehicles, the transmission being of such constructive nature that it may be expanded or enlarged to provide as many speeds as may be desired for the motor vehicle, and the selection of the desired speed may be easily and quickly attained by any suitable operating mechanism convenient to the driver or operator of the motor vehicle.

Another object of my invention is to provide a transmission mechanism of the above type wherein novel two-part gears and over-running clutches are employed so that gear parts may idle, automatically come into action, or travel at different speeds relative to other gear parts during the operation of the transmission mechanism, and these elements are assembled so that there is no possible danger of the same becoming accidentally displaced.

A still further object of my invention is to provide a transmission mechanism including a two-way conical clutch which is built into the transmission mechanism and easily actuated by controlling means adjacent the mechanism. With this clutch, as well as other movable parts of the transmission, there are anti-frictional bearings and provision for a thorough lubrication, so that friction is reduced to a minimum with practically no noise either during the operation of the transmission or change of speed. By building a clutch in the transmission mechanism I am able to dispense with the usual clutch for controlling the application of power.

The above are a few of the objects attained by my transmission and others may appear as the construction thereof is described, so reference will now be had to the drawings, wherein Figure 1 is a side elevation of the transmission mechanism, partly broken away and partly in longitudinal section;

Fig. 2 is a cross sectional view of the transmission mechanism taken on the line II—II of Fig. 1, looking in the direction of the arrows of said figure;

Fig. 3 is a similar view taken on the line III—III of Fig. 1 looking in the direction of the arrows;

Fig. 4 is a cross sectional view taken on the line IV—IV of Fig. 1;

Fig. 5 is a plan of a portion of the double acting clutch;

Fig. 6 is an enlarged cross sectional view of a portion of the transmission mechanism illustrating an over-running clutch;

Fig. 7 is an enlarged longitudinal sectional view of a portion of the transmission mechanism showing anti-frictional bearings;

Fig. 8 is an enlarged perspective view of a portion of one of the housing units, and Fig. 9 is an enlarged detail view of a portion of the transmission mechanism.

Figure 1:
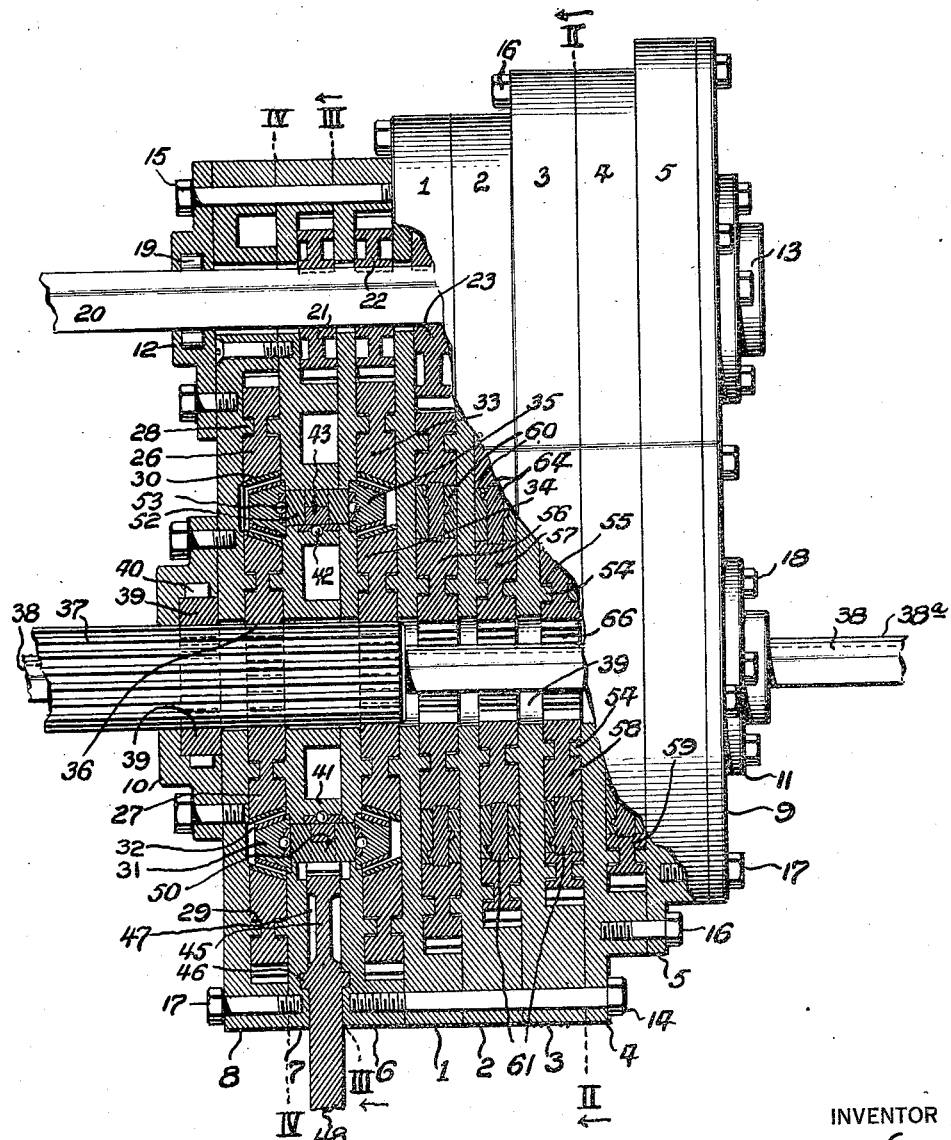

As set forth in the beginning, the transmission mechanism may be built to provide any desired number of speeds, besides the usual forward and reverse drive, and in order that a transmission mechanism of small change speed capacity may be enlarged or expanded to take care of a multiplicity of additional change speeds, I have made the transmission housing of separable units that may be increased or decreased in number to afford a transmission of desired change speed capacity. Many of the housing units are therefore similar in construction but vary in size, due to the different ratios of gear wheels employed for producing different speeds. For the purpose of understanding my invention I have shown a transmission mechanism having six speeds and those housing units designated 1, 2, 3, 4 and 5 are practically identical in construction, although gear chambers thereof vary slightly in size. In addition to the housing units 1 to 5 inclusive, there are clutch units 6 and 7, end plates 8 and 9, alining bearings units 10, 11, 12 and 13. The housing units 1 to 4 inclusive may be connected together and to the clutch unit 6 by screw bolts 14; the clutch units 6 and 7, the end plate 8 and the bearing unit 12 are connected together and to the housing unit 1 by screw bolts 15, and the housing units 1 to 5 inclusive may be connected to each other by screw bolts 16. In addition to these screw bolts or similar fastening means there are screw bolts 17 holding the end plates 8 and 9 and screw bolts 18 holding the bearing units 10 to 13 inclusive, thus providing a compact housing structure having separable units permitting of easy access being had to any part of the housing.

The alining bearing units 12 and 13 provide cages for anti-frictional bearings, as rollers 19 and said anti-frictional bearings support a drive shaft 20 which may be directly or indirectly driven from an engine or suitable source of power (not shown). The drive shaft 20 extends through the clutch and housing units in what may be considered the upper portion of the housing and keyed or otherwise fixed on said drive shaft, within the clutch units 6 and 7 and the housing units 1 to 5 inclusive, are gear wheels 21, 22, and 23, besides some wheels of variable diameters which are not shown.

In the upper part of the end plate 8 and the clutch unit 7 is journaled a shaft 24 which is disposed in parallelism with the shaft 20, and keyed or otherwise fixed on the shaft 24 is a long reverse gear wheel 25 which meshes with the gear wheel 21 and extends into the end plate 8 to mesh with the large gear wheel composed of concentric parts 26 and 27 within the end plate 8. The concentric gear wheel parts 26 and 27 are sandwiched between the clutch unit 7 and the end plate 8 and are housed in the latter and supported by annular ribs or bearings 28 on the confronting walls of the clutch unit 7 and the end plate 8, said ribs or bearings extending into annular grooves 29 in the faces of the gear wheel parts.

The confronting annular faces of the concentric gear wheel parts 26 and 27 are inclined or beveled and provided with liners 30 which co-operate in providing an annular clutch-way between the parts of the gear wheel and by reference to Fig. 1 it will be noted that the clutch-way is tapered in cross section with the clutch-way tapering inwardly from one face of the large gear wheel to the opposite face thereof and thus providing an annular conical seat for an annular conical clutch member 31 which has its tapering faces provided with liners 32 confronting the liners 30. The liners may be of any metal or material which will insure frictional or interlocking engagement between the clutch member 31 and the members 26 and 27 of the gear wheel. With the clutch member 31 shifted inwardly to seat between the gear wheel parts, a driving relation is established between said parts just as though said parts were integral or a complete gear wheel, otherwise with the clutch member disengaged the outer or peripheral gear part 26 may revolve independent of the inner or hub gear part 27.

In the clutch unit 6 is a two-part gear wheel composed of parts 33 and 34 served by a clutch member 35, said gear wheel parts and clutch member being constructed, supported and operatable similar to the gear wheel parts 26 and 27 and the clutch member 31 previously described, the gear wheel part 33 meshes with the gear wheel 22, and the inner gear wheel parts 27 and 34 are provided with internal gears or keys 36 through which extend a longitudinally toothed or keyed controlling selector member 37. This member is slidably keyed on a driven shaft 38, as at 38ª or may be fixed thereon with one end of the shaft in the bearing unit 11 and the selector member 37 slidable in a gear bearing 39 loose on anti-frictional bearings 40 in the bearing unit 10. Of course the end plate 8 and the clutch and housing units have axially alining openings 39 providing clearance for the selector member and said member may be shifted longitudinally of the transmission mechanism so as to fix inner or hub gear wheel parts for the transmission of power. Any suitable mechanism may be employed for shifting the selector member, and the teeth of the internal gears 36 and the teeth or keys on the selector member 37 may be of any number and shape so as to insure a positive connection between the selector member and inner or hub gear parts.

In the clutch unit 7 is a rim 41 and on said rim is an anti-frictional bearing 42 for a clutch ring 43 which has a portion of its periphery provided with a segment rack 44 and meshing with said segment rack is a sector gear 45 having opposed studs 46 pivotally mounted in the clutch units 6 and 7, as best shown in Fig. 1. The sector gear 45 is housed within a chamber 47 of the clutch unit 7 and said sector gear has an arm or lever 48 extending out of the transmission housing, as shown in Fig. 3, so that a suitable operating mechanism may be attached thereto. When the lever 48 is oscillated the clutch ring 43 may be shifted circumferentially of the anti-frictional bearing 42 in a desired direction, and said clutch ring has its periphery provided with transverse seats 49 for clutch shifting members 50. The inner wall of the ring 43 has cut away portions providing cams 43ª and opposed side walls of the clutch ring 43 are beveled, as at 51 and the clutch shifting members 50 have beveled ends 52. With the clutch shifting members 50 disposed transversely of the clutch ring 43 and the ends 52 thereof disposed in planes parallel to the side walls of the clutch ring 43, and adapted to be engaged by the cams 43ª the ends 52 of said clutch members will confront anti-frictional bearings 53 set in the faces of the clutch members 31 confronting the clutch shifting members 50. When the lever 48 is moved in one direction the clutch shifting members 50 will actuate one of the clutch members 31 and release the other, and it is in this manner that the gear wheel part 26 may be fixed relative to the inner gear wheel part 27 or the outer gear wheel part 33 fixed relative to the inner gear wheel part 34. The purpose of the double acting clutch within the clutch unit 7 and between the two-part gear wheels within the clutch unit 6 and the end plate 8 will appear when considering the operation of the transmission mechanism.

The housing units 1 to 5 inclusive have the confronting walls thereof provided with ribs or bearings 54 extending into annular grooves 55 provided therefor in two-part gear wheels which have been generally designated 56, 57, 58 and 59, said gear wheels being of various diameters and meshing with the gear wheels 23 mounted on the power or drive shaft 20. The gear wheels 23 are stepped to correspond to the stepped order of the gear wheels 56 to 59 inclusive and the last mentioned gear wheels are similar to the gear wheel parts 26 and 27. Loose supporting rings or bearings 60 can be disposed in parallelism between the gear wheel parts, and sandwiched between the supporting rings 60 are closely assembled pawls 61 having center studs 62 extending into one of the supporting rings and end studs 63 extending into the other of said supporting rings. With the pawls 61 supported intermediate the ends thereof on one of the supporting rings and an end of each pawl loosely connected to the other supporting ring, it is possible to shift all of the pawls from tangentially disposed positions towards radial positions when considering the common axis of the gear wheels 56 to 59 inclusive. As clearly shown in Fig. 2, all of the pawls 61 are closely assembled and tangentially disposed so that the pawls may be shifted or tilted to assume more of a radial position than that illustrated in Fig. 2. With the ends of the pawls rounded, as at 64, the assembled pawls will present a scalloped outer surface to each outer gear wheel part and a similar surface to each inner gear wheel part, said gear wheel parts having the confronting walls thereof scalloped so that the ends of the pivoted pawls may interlock with the inner and outer wheel parts and cause said parts to rotate in unison when the gear wheel, as a whole, is revolved in one direction. Otherwise, the outer gear wheel part may revolve independent of the inner gear wheel part. The novel compact arrangement of the pawls affords an overrunning clutch and with such a clutch associated with each of the speed gear wheels 56 to 59 inclusive, it is possible to select and utilize either of the gear wheels for a desired speed.

Before considering the operation of the transmission mechanism, I desire to direct attention to Figs. 4 and 7, the former showing a preferred form of anti-frictional bearings for the clutch members 31 and 35 and Fig. 7 showing that anti-frictional bearings 65 may be suitably disposed on the ribs or bearings 54 to permit of the gear wheel parts being supported with a minimum degree of friction. The anti-frictional bearings which have been shown are a fair example of other anti-frictional devices that may be distributed throughout the transmission mechanism to insure ease of operation.

With the speed gear wheels 56 to 59 inclusive provided with internal gears or keys 66, similar to the inner gear wheel parts 27 and 34, the selector member 37 may be shifted into the gear wheels 56 to 59 inclusive to attain a desired speed, and considering Fig. 1 the transmission mechanism has been shown in a neutral position. The neutral position is defined by the clutch members 31 and 35 being out of engagement with the gear wheel parts 26, 27, 33 and 34, in which instance all of the gear wheels 21, 22, and 23 and 25, and outer gear wheel parts 26, 33, and similar parts of the gear wheels 56 to 59 inclusive revolve due to the fact that the outer gear wheel parts are constantly in mesh with the gear wheels on the drive shaft 20.

A driving relation is established between shafts 20 and 38, with the selector member 37 in the position shown in Fig. 1 and by throwing in the clutch member 35, which fixes the outer gear wheel part 33 relative to the inner gear wheel part 34, so that power is transmitted from the drive shaft 20 by the gear wheel 22, gear wheel parts 33 and 34 to the selector member 37 and to the shaft 38, which is adapted for driving the rear axle of a vehicle or transmitting power to any machinery.

During this transmission of power, all outer gear wheel parts are driven but the inner gear wheel, parts 27 and 34 of said gear wheels are not actuated, although the inner gear wheel part 27 will be rotated at the speed by the selector member 37.

I attach considerable importance to all inner gear parts of gear wheels 56 to 59 being constantly driven, as the selector member 37 can easily intermesh with the same for a desired speed, and it is only when one speed is greater than others that the overrunning clutch of each gear wheel allows an inner part to run faster than an outer driving part.

Reverse drive is attained by retracting the clutch member 37 to neutral position and throwing the clutch member 31 into engagement with the gear wheel parts 26 and 27. Reverse drive is then transmitted from the shaft 20 through the gear wheels 21 and 25 to the gear wheel parts 26 and 27 and by the selector member 37 to the driven shaft 38. In this instance the inner gear wheel part 34 rotates with the selector member.

Second speed is attained by leaving the clutch members 31 and 35 in a neutral position and shifting the selector member 37 into the inner gear part of the gear wheel 56. The outer gear wheel parts 26 and 33 will be driven by the drive shaft 20 but since the clutch members 31 and 35 are in neutral position the inner gear wheel parts 27 and 34 are free to rotate with the selector member 37, so that said selector member may be driven by the interlocked parts of the gear wheel 56, representing second speed. The over-running clutch in the gear wheel 56 automatically becomes active and this is true of the remaining gear wheels 57 to 59 inclusive as long as the selector member 37 is out of engagement therewith, but when the selector member is shifted into engagement with the gear wheel 57 for third speed or the gear wheel 58 for fourth speed and so on, then the overrunning clutches of the second or third speed gear wheels automatically permit the inner gear wheel parts to revolve at a greater speed than the outer gear wheel parts. For instance, considering the selector member in the third speed gear 57, the over-running clutch of said gear wheel is active to establish a driving relation between the inner and outer gear parts, but the over-running clutch of the second speed gear wheel 56 is inactive and permits the inner gear wheel part to rotate with the selector member 37 independent and at a greater speed than the outer gear wheel part. This is also true as the speed is increased for the inner gear wheel parts will be driven at whatever speed is selected while the outer gear wheel parts will be driven at the speed of the drive shaft 20, except in the selected speed gears.

I attach considerable importance to the novel construction of the over-running clutch of each speed gear wheel, as the multiplicity of intermeshing wheels will positively establish a driving relation, when desired, between gear wheel parts. There can be no slipping or lost motion and the action is automatic throughout with the exception of the clutch members 31 and 35, which must be manually actuated, either for drive or reverse drive from the drive shaft 20 to the driven shaft 38.

It is thought that the operation and utility of the transmission mechanism will be apparent without further description, while in the drawings there is illustrated a preferred embodiment of my invention, it is to be understood that the structural elements are susceptible to such changes in size, shape and manner of assemblage as fall within the scope of the appended claims.

What I claim is:—

1. In a transmission mechanism by which variable speeds may be attained, constantly meshing gear wheels, some of said gear wheels being in two parts, selective means for utilizing said gear wheels for a desired speed, and a clutch mechanism between two of said gear wheels and operatable between the parts of the last mentioned gear wheels for utilizing one of said gear wheels for a forward drive and the other gear wheel for a reverse drive.

2. A transmission mechanism as characterized in claim 1, wherein said clutch mechanism includes separable annular clutch members with oscillatory means therebetween for shifting either of said clutch members.

3. In a transmission mechanism by which variable speeds may be attained, constantly meshing gear wheels, some of said gear wheels being in two concentric parts separated by an annular clutch way, selective means for utilizing said gear wheels for a desired speed, a clutch mechanism between two of said gear wheels and including clutch members operatable in the annular clutchway between the parts of the last mentioned gear wheels for utilizing one of said gear wheels for forward drive and the other of said gear wheels for reverse drive, and an over-running clutch between the parts of each of the other gear wheels.

4. A transmission mechanism as characterized in claim 3, wherein each over-running clutch is in the form of closely assembled tangentially disposed pawls adapted to connect the parts of each gear wheel for rotation together.

5. In a transmission mechanism by which variable speeds may be attained, parallel closely assembled clutch, end plate, and housing units, a drive shaft extending into said units, gear wheels fixed on said drive shaft, two-part gear wheels in said units constantly meshing with the first mentioned gear wheels, one of said two-part gear wheels being in the end plate and another in a clutch unit, a double acting clutch between parts of the two last mentioned gear wheels, oscillatory means extending into a clutch unit to operate said clutch, over-running clutches between parts of other gear wheels, and selective means axially of the two-part gear wheels for utilizing said gear wheels for forward and reverse drive and variable speeds.

6. In a transmission mechanism by which variable speeds and forward and reverse drives may be attained, drive gear wheels, two-part driven gear wheels constantly meshing therewith, a selective mechanism axially movable of the two-part gear wheel and adapted to be shifted so that either gear wheel may be used as a power transmission element, and automatic over-running clutches between the parts of some of said gear wheels, said over-running clutch being in the form of closely assembled tangentially disposed pawls adapted to have the ends thereof grip the parts of each gear wheel to lock the gear wheel parts for rotation together in one direction, the pawls otherwise permitting one gear wheel part rotating at a different speed from the other gear wheel part.

7. In a transmission mechanism by which direct and reverse drive and variable speeds may be attained, power transmitting gear wheels, and closely assembled tangentially disposed pawls embodied in some of said gear wheels to permit of certain gear wheels transmitting power independent of others.

8. A gear wheel for the transmission of power in a variable speed mechanism, comprising concentric inner and outer parts and tangentially disposed and closely assembled pawls between the parts of said gear wheel and adapted to cause the parts to rotate in unison in one direction and permit of one part of the gear wheel rotating faster than the other part in the same direction.

9. In a transmission mechanism by which direct and reverse drive may be attained, constantly meshing gear wheels, some of said gear wheels being in two parts concentrically disposed, selective means for utilizing either of the two-part gear wheels, clutch members between the parts of each gear wheel, shifting members between said clutch members, and oscillatory means for moving said shifting members so that either clutch member may be thrown in to connect the parts of either gear wheel.

10. A transmission mechanism as characterized in claim 9, wherein said oscillatory means includes a ring having a rack and a sector gear meshing with said rack.

In testimony whereof I affix my signature in the presence of two witnesses.

MERTON V. BROWN.

Witnesses:
KARL H. BUTLER,
ANNA M. DORR.